United States Patent
Schmidt (10) Patent No.: US 11,035,934 B2
(45) Date of Patent: Jun. 15, 2021

(54) SENSOR ASSEMBLY

(71) Applicant: Ford Global Technologies, LLC, Dearborn, MI (US)

(72) Inventor: David J. Schmidt, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 629 days.

(21) Appl. No.: 15/818,651

(22) Filed: Nov. 20, 2017

(65) Prior Publication Data
US 2019/0154799 A1    May 23, 2019

(51) Int. Cl.
| G01S 7/481 | (2006.01) |
| G01S 17/08 | (2006.01) |
| F25B 9/04 | (2006.01) |
| B60H 1/00 | (2006.01) |
| G01S 17/42 | (2006.01) |
| F25B 9/00 | (2006.01) |
| G01S 17/10 | (2020.01) |

(52) U.S. Cl.
CPC .......... *G01S 7/481* (2013.01); *B60H 1/00271* (2013.01); *F25B 9/004* (2013.01); *F25B 9/04* (2013.01); *G01S 7/4813* (2013.01); *G01S 7/4817* (2013.01); *G01S 17/08* (2013.01); *G01S 17/10* (2013.01); *G01S 17/42* (2013.01); *B60H 2001/003* (2013.01); *F25B 2700/2104* (2013.01); *F25B 2700/2106* (2013.01)

(58) Field of Classification Search
CPC . G03B 17/08; G01F 1/66; G01S 17/88; G01S 17/02; G02B 7/00
See application file for complete search history.

(56) References Cited

U.S. PATENT DOCUMENTS

| 5,567,052 A | 10/1996 | Yoshiike et al. |
| 7,751,188 B1 * | 7/2010 | French ............... H05K 7/20736 |
| | | 361/691 |
| 8,385,065 B2 | 2/2013 | Weaver et al. |
| 8,967,307 B2 | 3/2015 | Kim |
| 9,485,451 B2 | 11/2016 | Kawamura |
| 9,621,769 B2 | 4/2017 | Mai et al. |
| 9,746,666 B2 | 8/2017 | Eineren et al. |

(Continued)

FOREIGN PATENT DOCUMENTS

| CN | 204077513 U | 1/2015 |
| CN | 106494333 A | 3/2017 |

(Continued)

OTHER PUBLICATIONS

Zhu et al. article titled "Vortex Tube Heat Booster to Improve Performance of Heat Driven Cooling Cycles for Automotive Applications," SAE International Technical Paper #: 2016-01-0245, Published: Apr. 5, 2016.

(Continued)

*Primary Examiner* — Luke D Ratcliffe
(74) *Attorney, Agent, or Firm* — Frank A. MacKenzie; Bejin Bieneman PLC (57) ABSTRACT

A sensor assembly includes a navigation sensor. The sensor assembly includes a heatsink thermally coupled to the navigation sensor. The sensor assembly includes an air conditioning unit. The sensor assembly includes a duct positioned to direct airflow from the air conditioning unit toward the heatsink.

19 Claims, 7 Drawing Sheets

(56) References Cited

U.S. PATENT DOCUMENTS

| | | |
|---|---|---|
| 2007/0263684 A1 | 11/2007 | Nolan |
| 2010/0070090 A1* | 3/2010 | Mirpourian .......... F24F 5/0085 |
| | | 700/278 |
| 2010/0124058 A1 | 5/2010 | Miller |
| 2011/0205703 A1* | 8/2011 | Weaver ................. G03B 17/55 |
| | | 361/695 |
| 2015/0260843 A1 | 9/2015 | Lewis |
| 2015/0362363 A1 | 12/2015 | Haynes |
| 2016/0041452 A1* | 2/2016 | Nomura ................. G01S 17/02 |
| | | 356/5.01 |
| 2018/0164439 A1 | 6/2018 | Droz et al. |

FOREIGN PATENT DOCUMENTS

| | | |
|---|---|---|
| GB | 698407 A | 10/1953 |
| KR | 101642495 B1 | 7/2016 |

OTHER PUBLICATIONS

Non-Final Office Action for U.S. Appl. No. 15/818,656 as issued by the USPTO dated Apr. 9, 2020.
Notice of Allowance dated Sep. 18, 2020 for U.S. Appl. No. 15/818,656 (27 pages).

\* cited by examiner

SENSOR ASSEMBLY

BACKGROUND

Autonomous vehicles include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Some sensors are communications devices, for example, vehicle-to-infrastructure (V2I) or vehicle-to-vehicle (V2V) devices.

DETAILED DESCRIPTION

A sensor assembly includes a navigation sensor. The sensor assembly includes a heatsink thermally coupled to the navigation sensor. The sensor assembly includes an air conditioning unit. The sensor assembly includes a duct positioned to direct airflow from the air conditioning unit toward the heatsink.

The air conditioning unit may include a vortex tube having an air input, a warm air output, and a cold air output, the cold air output being in fluid communication with the duct.

The air conditioning unit may include a compressor in fluid communication with the air input of the vortex tube.

The sensor assembly may include a processor and a memory, the memory storing instructions executable by the processor to actuate the compressor based on a detected temperature of the navigation sensor.

The vortex tube may include a valve positioned at the warm air output and movable between an open position and a closed position.

The sensor assembly may include a processor and a memory, the memory storing instructions executable by the processor to actuate the valve based on a detected temperature of the navigation sensor.

The sensor assembly may include a processor and a memory, the memory storing instructions executable by the processor to actuate the valve based on information from a rain sensor.

The valve may include a conical plug and a linear actuator.

The sensor assembly may include a temperature sensor positioned to detect a temperature of airflow from the cold air output of the vortex tube.

The sensor assembly may include a temperature sensor positioned to detect a temperature of airflow to the air input of the vortex tube.

The warm air output may provide air to an ambient environment.

The sensor assembly may include a pillar, the air conditioning unit and the navigation sensor supported by the pillar.

The sensor assembly may include a sensor window, the duct positioned to direct airflow across the sensor window.

The heatsink may include a plurality of fins elongated between the duct and the sensor window.

The navigation sensor may be a LIDAR sensor.

The sensor assembly may include a processor and a memory, the memory storing instructions executable by the processor to actuate the air conditioning unit based on data indicating a weather condition.

The data indicating the weather condition may include at least one of a precipitation level, a humidity, and an external temperature.

The navigation sensor may include a motor thermally coupled to the heatsink.

The navigation sensor may include a circuit board thermally coupled to the heatsink.

With reference to the Figures, a sensor assembly 54 for a vehicle 30 includes a navigation sensor 68. The sensor assembly 54 includes a heatsink 90 thermally coupled to the navigation sensor 68. The sensor assembly 54 includes an air conditioning unit 99. The sensor assembly 54 includes a duct 104 positioned to direct airflow from the air conditioning unit 99 toward the heatsink 90.

The heatsink 90 helps dissipate heat generated inside the sensor assembly 54. The duct 104 is positioned to generate airflow so that the heatsink 90 may be able to dissipate a greater quantity of heat than without the airflow. The air conditioning unit 99 cools the airflow to increase the quantity of heat dissipated with the heatsink 90.

Figure 1:
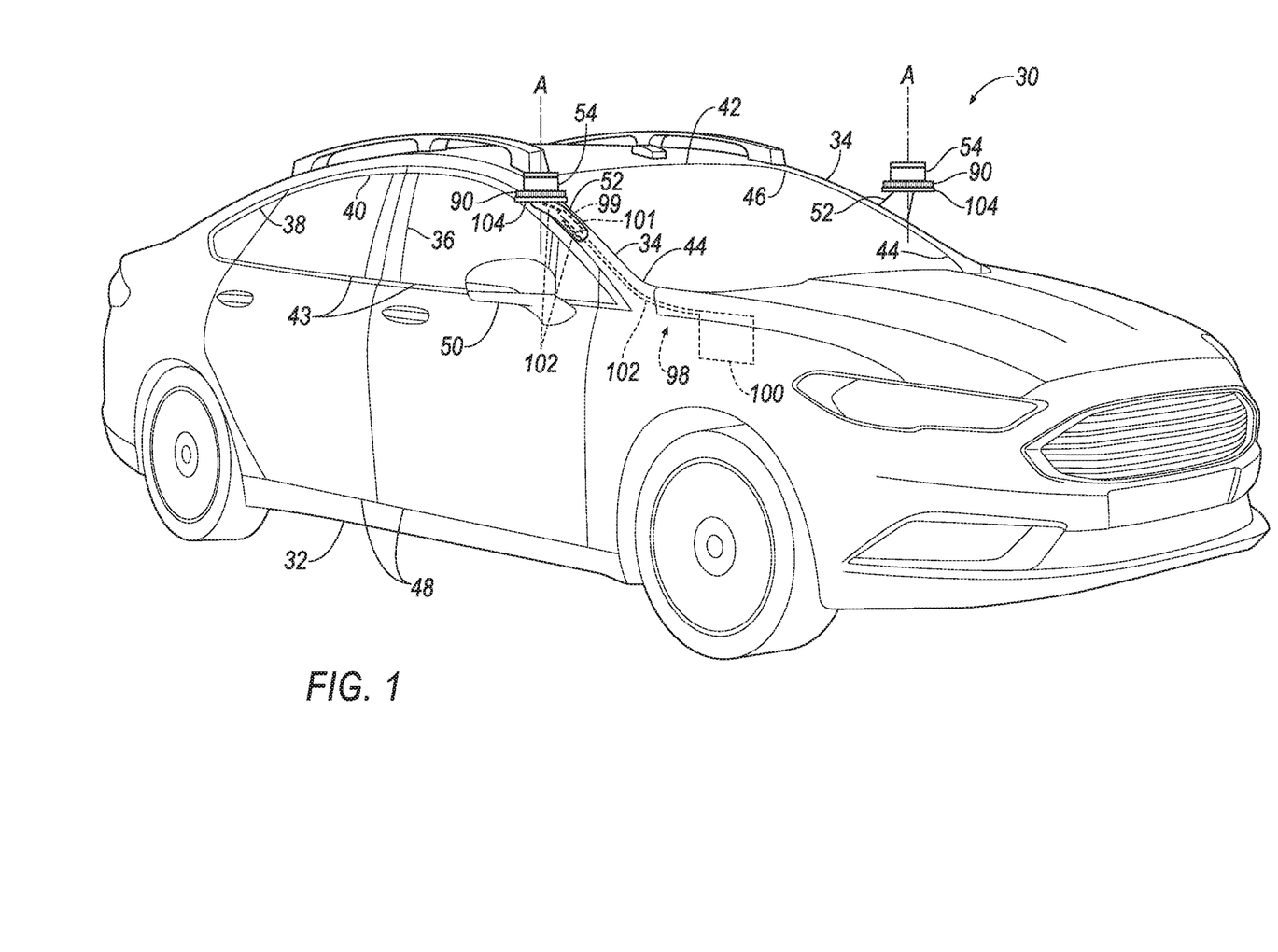
FIG. 1 is a perspective view of a vehicle including sensor assemblies.

With reference to FIG. 1, a body 32 of the vehicle 30 may include A pillars 34, B pillars 36, C pillars 38, and roof rails 40. The A pillars 34 may extend between a windshield 42 and windows 43 and from a first end 44 at a bottom of the windshield 42 to a second end 46 at a top of the windshield 42. (The adjectives "first" and "second" are used throughout this document as identifiers and are not intended to signify importance or order.) The B pillars 36 may extend between the windows 43 of adjacent doors 48. The C pillars 38 may extend between the windows 43 and a backlite (not shown). The body 32 may also include D pillars (not shown) if the vehicle 30 is, e.g., an SUV, crossover, minivan, or station wagon, in which case the C pillars 38 extend between the windows 43 of rear doors 48 and rear left and right windows 43, and the D pillars extend between the rear right and left windows 43 and the backlite. The roof rails 40 extend along the windows 43 from the A pillar 34 to the B pillar to the C pillar.

The windshield 42, windows 43, and backlite may be formed of any suitably durable transparent material, including glass such as laminated, tempered glass or plastic such as Plexiglas or polycarbonate. The windshield 42 is located adjacent the A pillars 34.

The vehicle 30 may include side-view mirrors 50. The side-view mirrors 50 may be located on the front doors 48 or on the body 32 near the bottom of the windshield 42. The side-view mirrors 50 may be visible to a human driver through the windows 43 and provide a reflected view of a vehicle-rearward direction to the driver.

With continued reference to FIG. 1, a sensor arm 52 extends from one of the pillars 34, 36, 38 of the vehicle 30, e.g., the A pillar 34, to the sensor assembly 54. The sensor arm 52 may be located between the ends 44, 46 of the A pillar 34, that is, spaced from the bottom of the windshield 42 and from the top of the windshield 42, that is, spaced from the first end 44 and from the second end 46. The sensor arm 52 may be attached to a base 56 of the sensor assembly 54. The sensor arm 52 may have a tubular or other hollow shape, that is, a cavity may extend through the sensor arm 52. The cavity may allow wiring, tubes, etc. to pass through the sensor arm 52 while being shielded from the outside environment.

Figure 2:
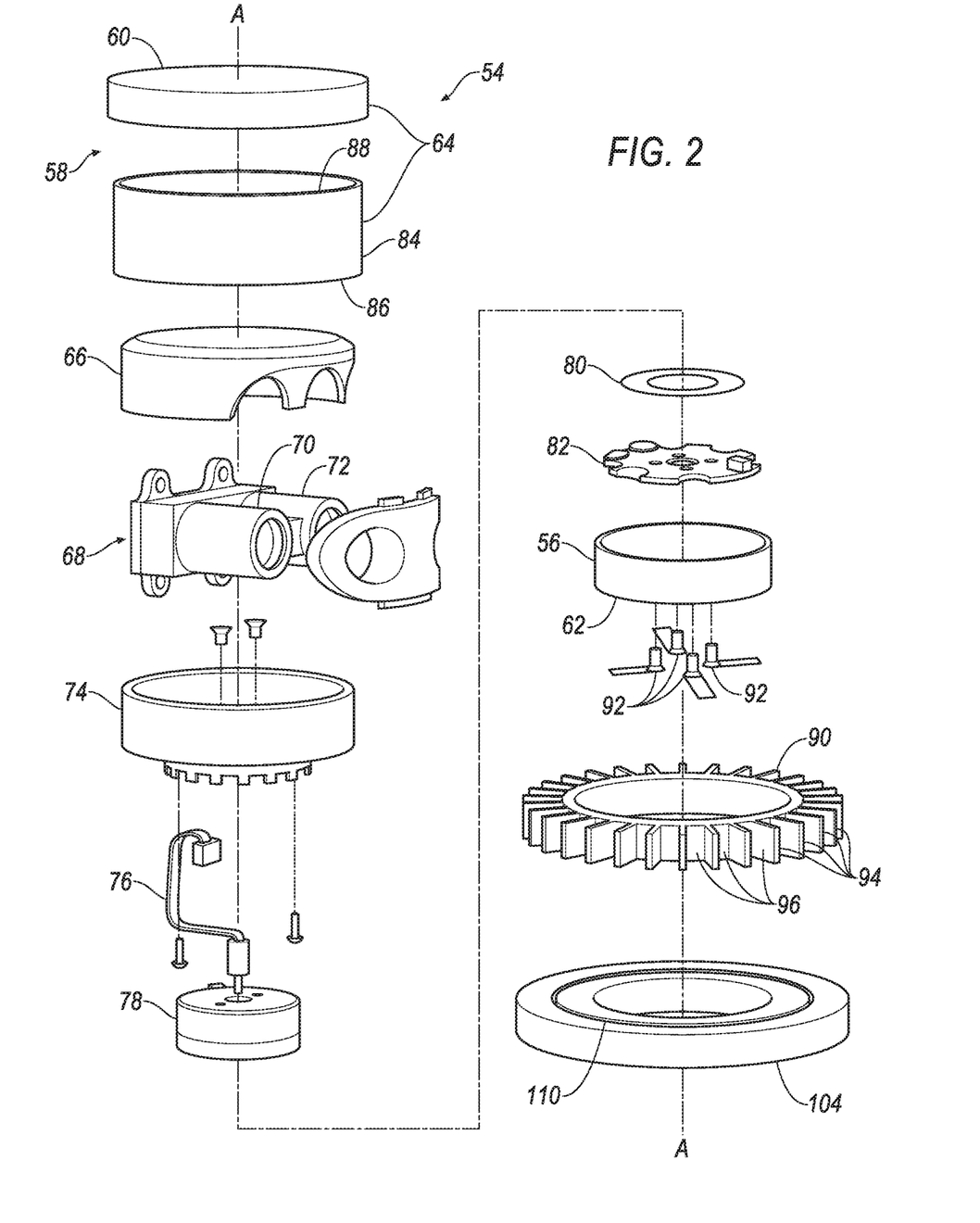
FIG. 2 is a perspective exploded view of one of the sensor assemblies.
Figure 3:
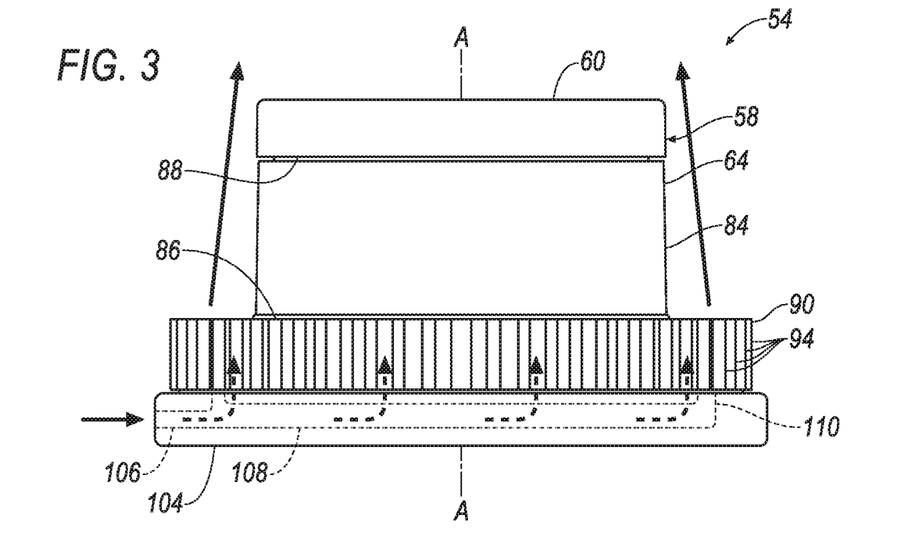
FIG. 3 is a side view of the sensor assembly.

With reference to FIGS. 1-3, the sensor assembly 54 is supported by the sensor arm 52. The sensor assembly 54 includes a housing 58. The housing 58 may have a cylindrical shape with a top cap 60, the base 56, and the sensor window 84. The top cap 60 is above, i.e., in a vehicle-upward direction from, the sensor window 84, and the base 56 is below, i.e., in a vehicle-downward direction from the sensor window 84. The housing 58 has a side surface 64 that includes an outside of the sensor window 84 and circumferentially extending sides of the top cap 60 and the base 56. The side-view mirrors 50 may be located below the housings 58, that is, in a vehicle-downward direction from the housings 58, and each base 56 has a bottom surface 62 that faces each side-view mirror. The cylindrical shape of the housing 58 defines an axis A, which runs through a center of the housing 58. The axis A is oriented vertically relative to the vehicle 30.

With reference to FIG. 2, the navigation sensor 68 is disposed inside the housing 58 and is attached to and supported by the sensor arm 52. The navigation sensor 68 may be designed to detect features of the outside world; for example, the navigation sensor 68 may be a radar sensor, a scanning laser range finder, a light detection and ranging (LIDAR) device, or an image processing sensor such as a camera. In particular, the navigation sensor 68 may be a LIDAR device. A LIDAR device detects distances to objects by emitting laser pulses at a particular wavelength and measuring the time of flight for the pulse to travel to the object and back.

The housing 58 may contain a rotating head 66, the navigation sensor 68 including a laser 70 and a receiver 72, an encoder 74, a slip ring 76, a motor 78, an insulator 80, and a circuit board 82. The circuit board 82, the insulator 80, and the motor 78 may be fixed relative to the housing 58. The encoder 74, the slip ring 76, and the navigation sensor 68 are fixed relative to each other and rotatably coupled to the motor 78. The motor 78 is configured to rotate the navigation sensor 68 about a vertical axis A to provide horizontal 360° coverage. The insulator 80 may be positioned between the circuit board 82 and the motor 78 and may reduce the amount of heat traveling between the circuit board 82 and the motor 78.

With reference to FIGS. 2 and 3, the sensor window 84 is supported by and attached to the sensor arm 52, such as via the base 56. The sensor window 84 may be cylindrical and may also define the axis A. The sensor window 84 extends about the axis A. The sensor window 84 may extend fully about the axis A, that is, 360°, or partially about the axis A. The sensor window 84 extends along the axis A from a bottom edge 86 to a top edge 88. The sensor window 84 has a diameter. The diameter of the sensor window 84 may be the same as the rest of the side surface 64, if any; in other words, the sensor window 84 may be flush or substantially flush with the side surface 64. "Substantially flush" means a seam between the sensor window 84 and the rest of the side surface 64 does not cause turbulence in air flowing along the side surface 64. At least some of the sensor window 84 is transparent with respect to whatever medium the navigation sensor 68 is capable of detecting. For example, if the navigation sensor 68 is a LIDAR device, then the sensor window 84 is transparent with respect to visible light at the wavelength generated by the laser 70.

With reference to FIGS. 2-5, the heatsink 90 may be attached, e.g., fastened, adhered, etc., to the rest of the sensor assembly 54 and fixed relative to the sensor window 84. For example, the heatsink 90 may be fastened by one or more linkages 92 extending through the base 56. The heatsink 90 may be disposed below the sensor window 84 and annularly around the base 56. The heatsink 90 may be spaced from the base 56 or may touch the base 56. If the heatsink 90 is spaced from the base 56, the space between the heatsink 90 and the base 56 may be filled with a thermal gap filler such as thermal grease or silicon-coated gap filler. The heatsink 90 may be exposed to the ambient environment; i.e., no cover extends over the heatsink 90.

The heatsink 90 may be a material having a high thermal conductivity, e.g., aluminum or copper. Thermal conductivity is the property of a material to transmit heat. The heatsink 90 has a higher thermal conductivity than other components of the sensor assembly 54 such as the housing 58 and the sensor window 84.

With reference to FIG. 2, the heatsink 90 is thermally coupled to the navigation sensor 68, e.g., the heatsink 90 is directly connected to the circuit board 82 and/or the motor 78 by the linkages 92. The linkages 92 are thermal conductors. A thermal conductor, for the purposes of this disclosure, is defined as a component with a high thermal conductivity, substantially at least as high as the thermal conductivity of the heatsink 90.

With reference to FIGS. 2-5, the heatsink 90 is arranged annularly about the axis A. The heatsink 90 includes the plurality of fins 94. The fins 94 are oriented and elongated vertically, i.e., parallel to the axis A, and radially, i.e., away from the axis A. The fins 94 may be elongated between the duct 104 and the sensor window 84. Each fin 94 may have, e.g., a rectangular shape. The fins 94 are exposed to the ambient environment. Each adjacent pair of fins 94 defines a gap 96 therebetween. The gaps 96 permit airflow between the fins 94 and allow heat to flow from the fins 94 to the ambient air. Multiple of the fins 94, e.g., the fins 94 on the vehicle-forward side of the heatsink 90, may be positioned to receive airflow therebetween from forward motion of the vehicle 30.

Figure 6:
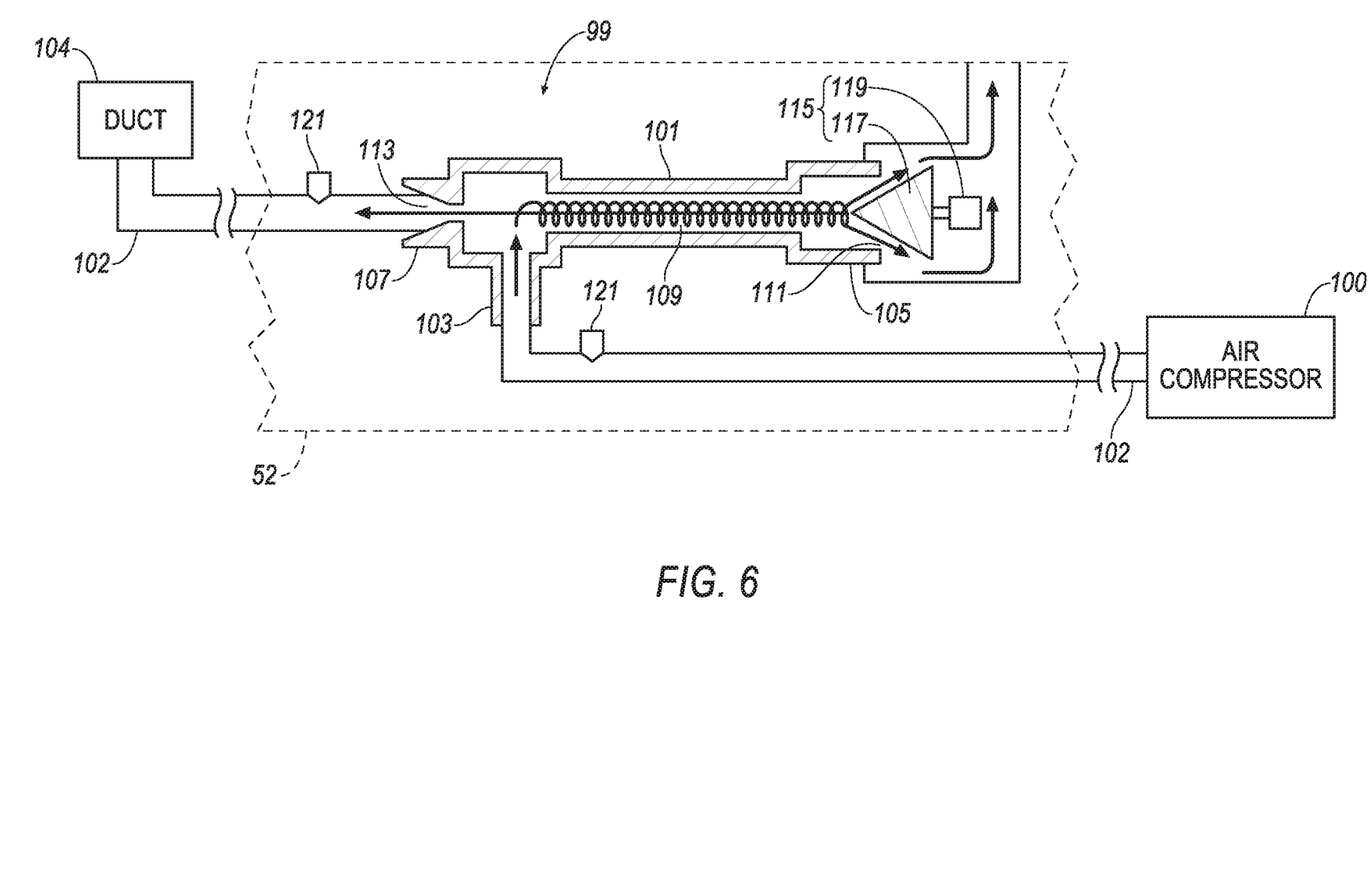
FIG. 6 is a cross section of an air conditioning unit of the sensor assembly with a valve in an open position.
Figure 7:
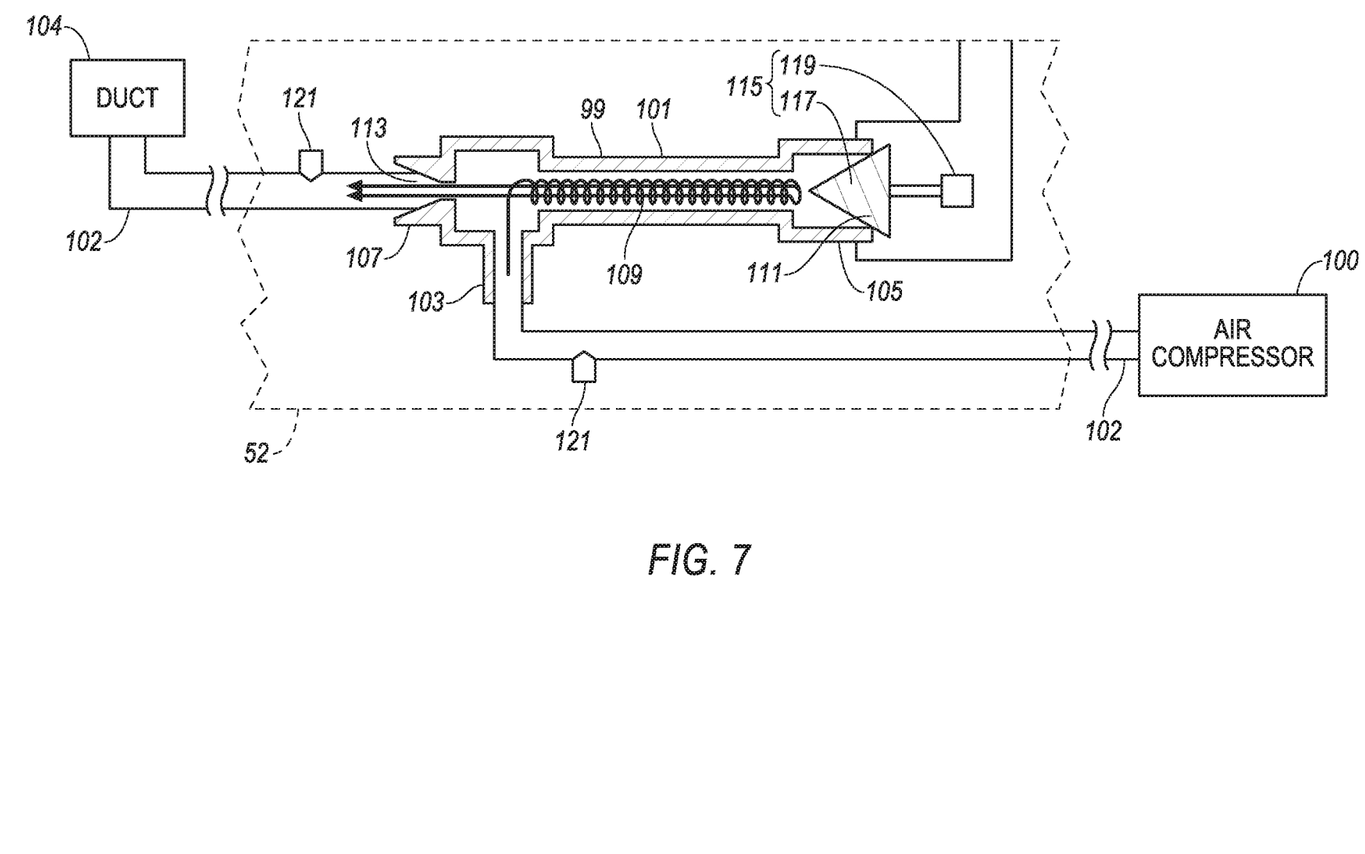
FIG. 7 is a cross section of the air conditioning unit of the sensor assembly with the valve in a closed position.

With reference to FIGS. 1, 6, and 7, an air system 98 includes the air conditioning unit 99, a compressor 100, supply lines 102, and the duct 104. The compressor 100 and the duct 104 are fluidly connected to each other (i.e., fluid can flow from one to the other) via the supply lines 102

The air condition unit 99, shown in FIGS. 1 and 6-8, provides chilled air, e.g., to the duct 104. The air conditioning unit 99 may receive air from the compressor 100. The air conditioning unit 99 may include a vortex tube 101. The vortex tube 101 has an air input 103, a warm air output 105, and a cold air output 107. The vortex tube 101 defines a swirl chamber 109 that extends from a first end 111 to an open second end 113. The air input 103 provides air tangentially to the swirl chamber 109 between the first end 111 and the second end 113. Air swirls within the swirl chamber 109, with warmer air at a radial periphery of the swirl chamber 109 and cooler air at an axially extending centerline of the swirl chamber 109. The warm air output 105 provides warm air, e.g., relative to air provided to the air input 103 and the cold air output 107, from the first end 111. The warm air output 105 may be positioned to provide warm air to the ambient environment. The cold air output 107 provides cold air, e.g., relative to air provided to the air input 103 and the warm air output 105, from the open second end 113. The cold air output 107 may be positioned to provide cold air to the duct 104. The air condition unit 99 may be of another type, e.g., a heat pump, an evaporative cooling device, etc.

The vortex tube 101 includes a valve 115 positioned at the warm air output 105. The valve 115 may include a conical plug 117 and a linear actuator 119. The valve 115 is movable between an open position, shown in FIG. 6, and a closed position, shown in FIG. 7. In the open position air is permitted to flow from the warm air output 105. For example, the conical plug 117 may be disposed within and spaced from the first end 111 permitting air to escape at the periphery of the swirl chamber 109. In the closed position air is inhibited from flowing from the warm air output 105. For example, the conical plug 117 may abut the first end 111 and block air from flowing therethrough. The linear actuator 119 may be an electromagnetic solenoid, a linear servo, etc. The linear actuator 119 is positioned to move the conical plug 117 to open and close the valve 115.

Moving the valve 115 between the open and closed positions varies a volume and a temperature of air flowing out of the cold air output 107. As the valve 115 moves to the closed position, less warm air is permitted to the flow from the warm air output 105, increasing the volume and temperature of air flowing from the cold air output 107. As the valve 115 moves to the open position, more warm air is permitted to the flow from the warm air output 105, decreasing the volume and temperature of air flowing out of the cold air output 107.

The vortex tube 101 may be supported by one of the pillars 34, 36, 38 of the vehicle 30, e.g., the A pillar 34. For example, the vortex tube 101 may be disposed within the cavity extending through the sensor arm 52.

The compressor 100 is fixed relative to the sensor window 84 and may be located in the vehicle 30 spaced from the sensor assembly 54. The compressor 100 increases the pressure of a gas by reducing a volume of the gas or by forcing additional gas into a constant volume. The compressor 100 may be any suitable type of compressor, e.g., a positive-displacement compressor such as a reciprocating, ionic liquid piston, rotary screw, rotary vane, rolling piston, scroll, or diaphragm compressor; a dynamic compressor such as an air bubble, centrifugal, diagonal, mixed-flow, or axial-flow compressor; or any other suitable type.

The supply lines 102 extend from the compressor 100 to air conditioning unit 99, e.g., to the air input 103 of the vortex tube 101, from the air conditioning unit 99 to the duct 104, e.g., from the cold air output 107 of the vortex tube 101, etc., to provide fluid communication therebetween. The supply lines 102 may be, e.g., flexible tubes.

With reference to FIGS. 2-7, the duct 104 is positioned to direct airflow from the air conditioning unit 99 toward the heatsink 90. For example, the duct 104 may receive airflow from the compressor 100 via the vortex tube 101; e.g., the duct 104 may include an inlet 106 to which the supply line 102 from the cold air output 107 is attached. The duct 104 may define an annular cavity 108 positioned below the heatsink 90. The diameter of the duct 104 may be larger than the diameter of the sensor window 84.

The duct 104 is positioned to direct airflow between the fins 94 and across the sensor window 84; in other words, a single pathline of the generated airflow from the duct 104 extends both between the fins 94 and from one side of the sensor window 84 to the other, e.g., from the bottom edge 86 to the top edge 88. "Across" means from one side of something to the other side. A "pathline" is defined as a trajectory of an individual fluid particle through a velocity vector field of a fluid. The airflow may form an air curtain across the sensor window 84; that is, the duct 104 is positioned to create an air curtain across the sensor window 84. An "air curtain" is a layer of moving air.

Figure 4:
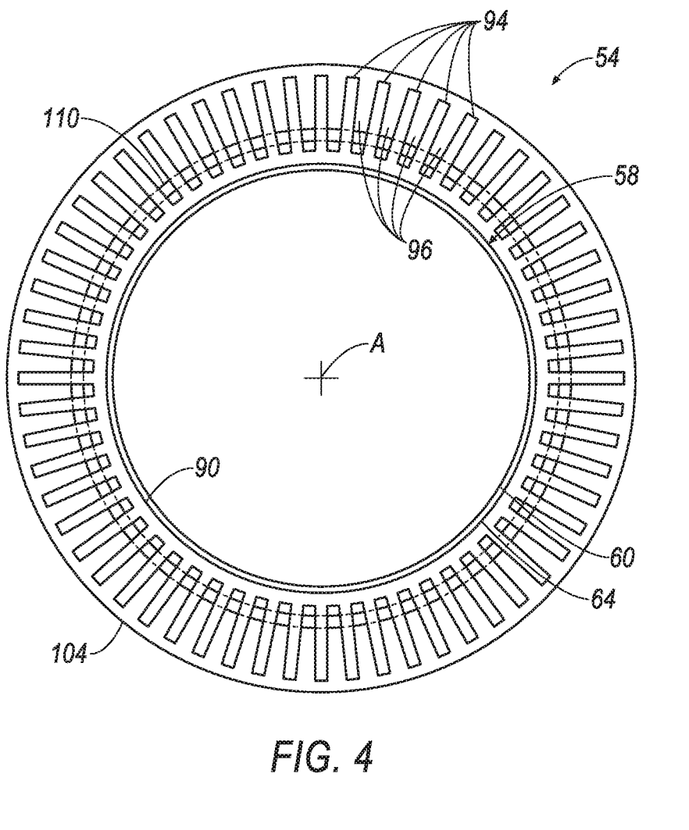
FIG. 4 is a top view of the sensor assembly with an example duct.
Figure 5:
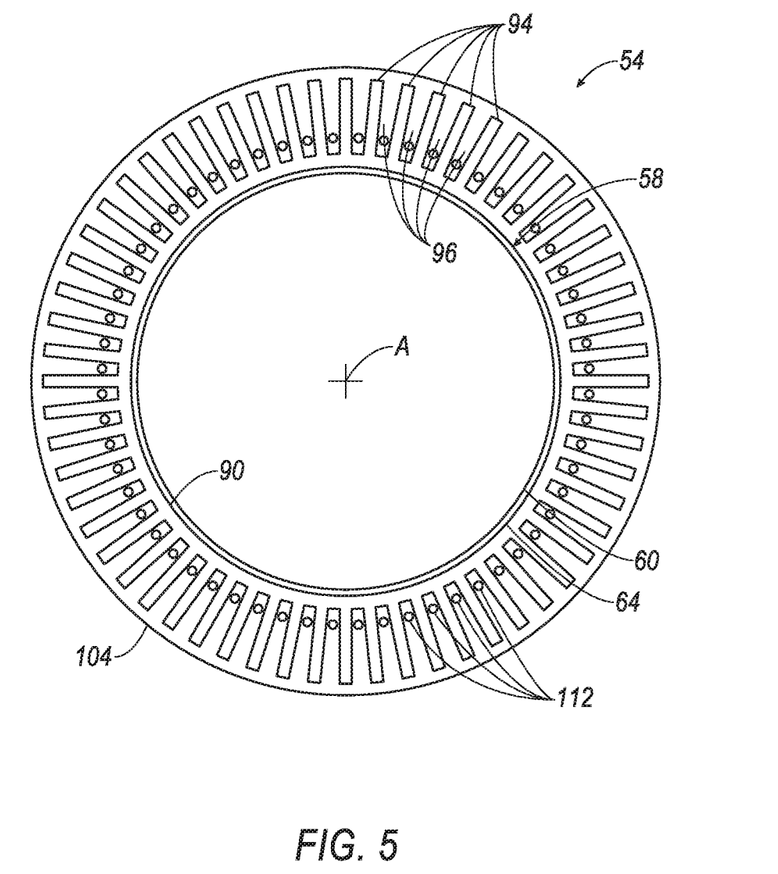
FIG. 5 is a top view of the sensor assembly with another example duct.

With reference to FIGS. 4 and 5, the duct 104 may include one or more openings 110, 112 directed upward from the cavity 108. For example, the duct 104 may include a slot 110 extending below multiple of the fins 94 or all the fins 94, as shown in FIG. 4. Air flowing from the slot 110 travels upward, is separated by the fins 94 into the gaps 96, and continues from the fins 94 across the sensor window 84. For another example, the duct 104 may include a plurality of nozzles 112, as shown in FIG. 5. Each nozzle 112 may be positioned to direct airflow through one of the gaps 96; e.g., each nozzle 112 may be positioned below one of the gaps 96. Air flowing from the nozzles 112 travels upward between the fins 94 and then across the sensor window 84.

Figure 8:
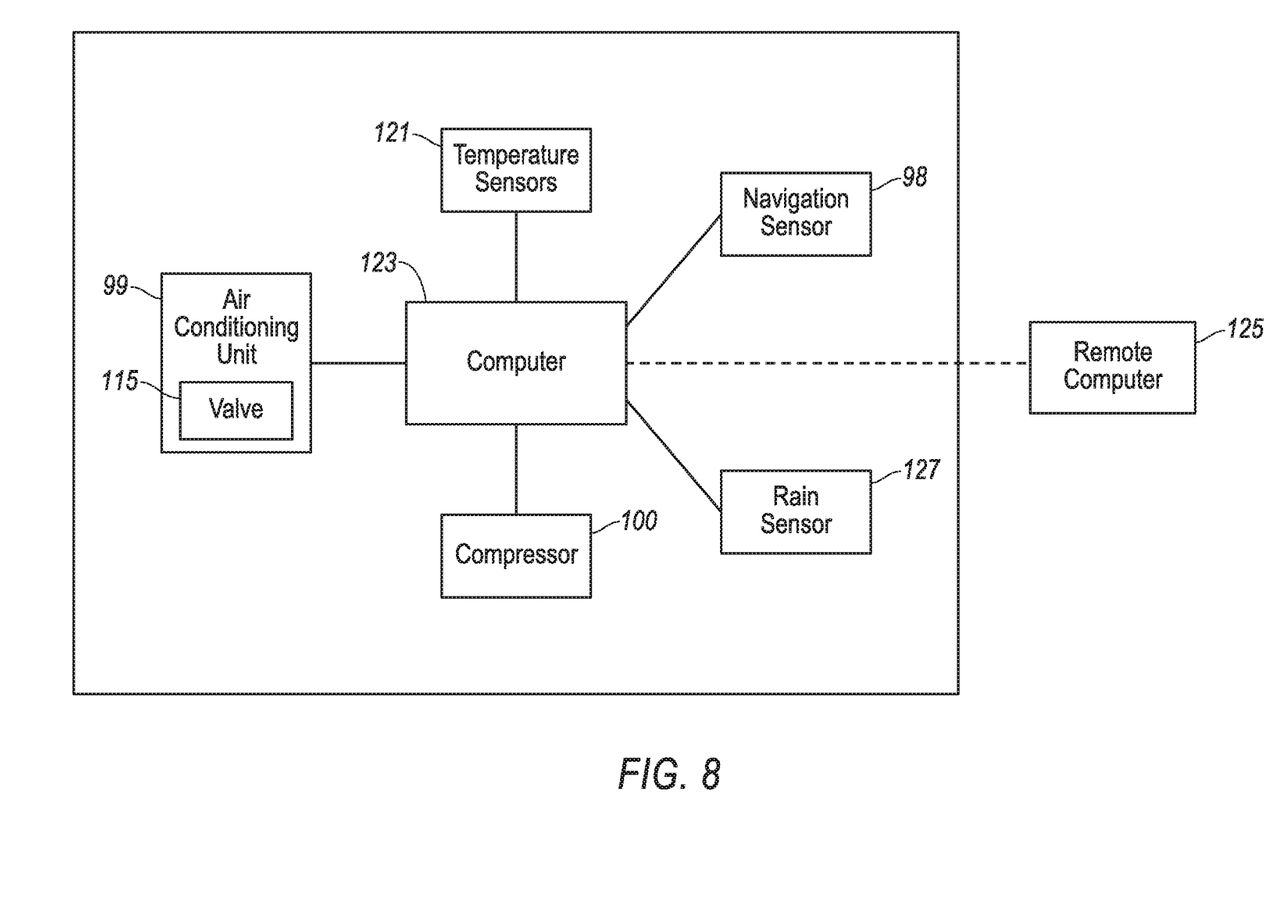
FIG. 8 is a block diagram of electrical components of the sensor assembly.

The sensor assembly 54 includes one or more temperature sensors 121, shown in FIGS. 6-8. The temperature sensors 121 may be resistance temperature detectors, thermal image cameras, etc. One or more temperature sensors 121 may be positioned to detect a temperature of the airflow from the cold air output 107, e.g., air flowing through the supply line 102 connecting the duct 104 to the cold air output 107. For example, one or more sensors 121 may be secured to the supply line 102 connecting the duct 104 to the cold air output 107 and extend into such supply line 102. One or more temperature sensors 121 may be positioned to detect a temperature of the airflow to the air input 103 of the vortex tube 101, e.g., air flowing through the supply line 102 connecting the compressor 100 to the air input 103 of the vortex tube 101. For example, one or more sensors 121 may be secured to the supply line 102 connecting the compressor 100 to the air input 103 and extend into such supply line 102. One or more temperature sensors 121 may be positioned to detect a temperature of the navigation sensor 68, e.g., a temperature of the motor 78, the circuit board 82, etc. For example, one or more sensors 121 may be secured to, and thermal coupled to the motor 78, the circuit board 82, etc. One or more temperature sensors 121 may be positioned to detect a temperature of the heatsink 90. For example, one or more sensors 121 may be secured to, and thermal coupled to the heatsink 90.

The sensor assembly 54 may include a rain sensor 127. The rain sensor 127 detects precipitation, e.g. external to the vehicle 30. The rain sensor 127 may be supported at various locations of the body 32 of the vehicle 30, or at any other suitable location.

In operation, the motor 78 rotates the navigation sensor 68 about the axis A while the laser 70 emits light pulses and the receiver 72 receives the reflected light bursts. The circuit board 82 processes signals from the navigation sensor 68. The sensor assembly 54, particularly the motor 78 and the circuit board 82, generate heat during operation. Some of the heat conducts through the linkages 92 to the heatsink 90. The compressor 100 blows air through the supply line 102 to the duct 104 and through the openings 110, 112. The airflow travels across the heatsink 90, absorbing heat from the surface of the fins 94, and then across the sensor window 84. The airflow across the sensor window 84 may reduce debris hitting the sensor window 84.

The sensor assembly 54 may include a computer 123. The computer 123 is a computing device that generally includes a processor and a memory, the memory including one or more forms of computer-readable media, and storing instructions executable by the processor for performing various operations, including as disclosed herein. The computer 123 may include an antenna. The computer 123 is generally configured for communications on a controller area network (CAN) bus or the like, and/or for using other wired or wireless protocols, e.g., Bluetooth®, IEEE 802.11 (colloquially referred to as WiFi), satellite telecommunication protocols, and cellular protocols such as 3G, LTE, etc. The computer 123 may be in communication with the navigation sensor 68, the temperature sensors 121, the compressor 100, the air conditioning unit 99, a remote computer 125, etc.

The computer 123 may be programmed to actuate the compressor 100 and/or the air conditioning unit 99, e.g., the valve 115, based on a detected temperature of the navigation sensor 68, a detected temperature of the airflow from the cold air output 107, etc. For example, when the computer 123 detects that the temperature of the navigation sensor 68 is above a threshold amount, e.g., 100 degrees Fahrenheit, the computer may actuate the compressor 100 to provide airflow. For example, when the computer 123 detects that the temperature of the airflow from the cold air output 107 is above a threshold amount, e.g., 70 degrees Fahrenheit, the computer 123 actuate the valve 115 to the open position to provide cool air.

The computer 123 may be programmed to actuate the compressor 100 and/or the air conditioning unit 99, e.g., the valve 115, based on information from the rain sensor 127. For example, when the computer 123 receives information from the rain sensor 127 indicating that rain is falling, the computer 123 may instruct the compressor 100 to provide air, and may instruct the valve 115 of the air conditioning unit 99 to the closed position, e.g., to maximize air flow through the duct 104 to dry the sensor window 84.

The computer 123 may be programmed to actuate the compressor 100 and/or the air conditioning unit 99 based on data indicating a weather condition. The data indicating the weather condition may include at least one of a precipitation level, a humidity, and an external temperature. For example, when the computer 123 receives data, e.g., from the remote computer 125, indicating that the precipitation rate level is above a threshold, e.g., 0.25 inches per hour, or has been above the threshold within a threshold amount of time, e.g., one hour, the computer 123 may instruct the compressor 100 to provide air, and may instruct the valve 115 of the air conditioning unit 99 to the closed position, e.g., to maximize air flow through the duct 104 to dry the sensor window 84. For example, when the computer 123 receives data, e.g., from the remote computer 125, indicating that the humidity level is above a threshold, e.g., 80 percent, the computer 123 may instruct the compressor 100 to provide air, and may instruct the valve 115 of the air conditioning unit 99 to the closed position, e.g., to maximize air flow through the duct 104 to defog the sensor window 84. For example, when the computer 123 receives data, e.g., from the remote computer 125, indicating that the temperature level is above a threshold, e.g., 80 degrees Fahrenheit, the computer 123 may instruct the compressor 100 to provide air, and may instruct the valve 115 of the air conditioning unit 99 to the open position, e.g., to minimize the temperature of the air flow through the duct 104 to cool the navigation sensor 68.

The remote computer 125 may be implemented as described for the computer 123. The remote computer 125 may be a server computer that stores information for access by other computers such as the computer 123. The remote computer 125 may store weather data, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A sensor assembly, comprising:
   a navigation sensor that is one of a camera or a LIDAR;
   a heatsink thermally coupled to the navigation sensor;
   an air conditioning unit; and
   a duct positioned to direct airflow from the air conditioning unit toward the heatsink.

2. The sensor assembly of claim 1, wherein the air conditioning unit includes a vortex tube having an air input, a warm air output, and a cold air output, the cold air output being in fluid communication with heatsink via the duct.

3. The sensor assembly of claim 2, wherein the air conditioning unit includes a compressor in fluid communication with the air input of the vortex tube.

4. The sensor assembly of claim 3, further comprising a processor and a memory, the memory storing instructions executable by the processor to actuate the compressor based on a detected temperature of the navigation sensor.

5. The sensor assembly of claim 2, wherein the vortex tube includes a valve positioned at the warm air output and movable between an open position and a closed position.

6. The sensor assembly of claim 5, further comprising a processor and a memory, the memory storing instructions executable by the processor to actuate the valve based on a detected temperature of the navigation sensor.

7. The sensor assembly of claim 5, further comprising a processor and a memory, the memory storing instructions executable by the processor to actuate the valve based on information from a rain sensor.

8. The sensor assembly of claim 5, wherein the valve includes a conical plug and a linear actuator.

9. The sensor assembly of claim 2, further comprising a temperature sensor positioned to detect a temperature of airflow from the cold air output of the vortex tube.

10. The sensor assembly of claim 2, further comprising a temperature sensor positioned to detect a temperature of airflow to the air input of the vortex tube.

11. The sensor assembly of claim 2, wherein the warm air output provides air to an ambient environment.

12. The sensor assembly of claim 1, further comprising a pillar, the air conditioning unit and the navigation sensor supported by the pillar.

13. The sensor assembly of claim 1, further comprising a sensor window, the duct positioned to direct airflow from the air conditioning unit along the heatsink and across the sensor window.

14. The sensor assembly of claim 13, wherein the heatsink includes a plurality of fins elongated between the duct and the sensor window.

15. The sensor assembly of claim 1, further comprising a processor and a memory, the memory storing instructions executable by the processor to actuate the air conditioning unit based on data indicating a weather condition.

16. The sensor assembly of claim 15, wherein the data indicating the weather condition includes at least one of a precipitation level, a humidity, and an external temperature.

17. The sensor assembly of claim 1, wherein the navigation sensor includes a motor thermally coupled to the heatsink.

18. The sensor assembly of claim 1, wherein the navigation sensor includes a circuit board thermally coupled to the heatsink.

19. The sensor assembly of claim 1, wherein the air conditioning unit is upstream of the heatsink.

* * * * *